Dec. 4, 1956  J. F. H. VAESSEN  2,772,758
LEADED GLASS PANES
Filed Aug. 28, 1953

INVENTOR.
J. F. H. Vaessen
BY
Wenderoth, Lind + Ponack
Attorneys

United States Patent Office 2,772,758
Patented Dec. 4, 1956

2,772,758

LEADED GLASS PANES

Joannes Franciscus Hubertus Vaessen,
Vught, Netherlands

Application August 28, 1953, Serial No. 377,190

Claims priority, application Netherlands
September 6, 1952

3 Claims. (Cl. 189—77)

The present invention relates to the construction of windows with leaded glass panes, in which the usual lead strips in which the panes are mounted are replaced by strips of plastic or synthetic resin. A particular object of the invention is the interconnection of the strips in such a manner that not only a firm connection but at the same time a decorative effect and an artistic finish are obtained, so as to provide a valuable substitute for the real leaded glass panes.

Figure 1:
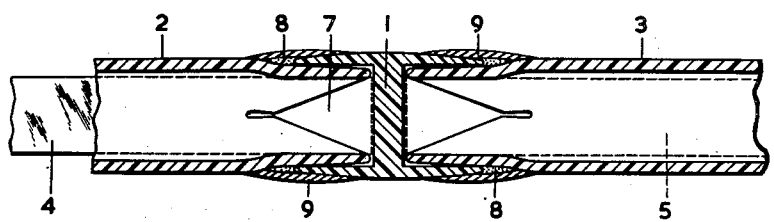

The invention is illustrated with reference to the accompanying drawing, in which:

Fig. 1 shows a section, and

Figure 2:
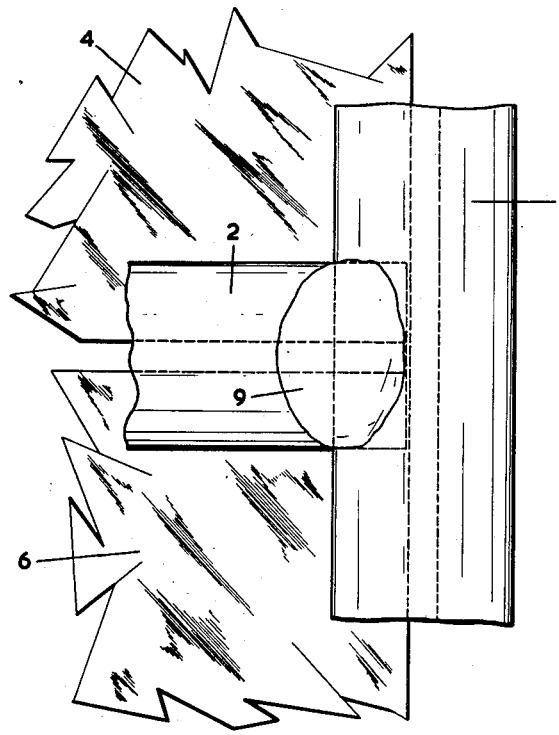

Fig. 2, a plan view of a connection of plastic strips according to the invention.

The strips 1, 2 and 3 generally show a doube T-shape having a broad flange on both edges of the web to surround on either side of the web a pane 4, 5 or 6, that may be of glass artificial glass, celluloid or other transparent material. The strips may also be U-shaped, in which case a pane can be provided at one side only. Said strips are made of a more or less thermoplastic plastic or synthetic resin, and they are preferably bendable or they admit—after moderate heating—of being bent into the shapes such, for example, as are usual in stained-glass windows.

In order to secure a transverse strip 2 or 3 respectively on one or on both sides of the continuous strip 1 I proceed as follows according to the invention.

At the end of the transverse strip 2 or 3 to be secured to the continuous strip 1 in order to form a connection, a triangular recess 7 is cut out of the web, so that said strips can be inserted between the adjacent flanges of the strip 1. At their junctions the strips are heated until the thermoplastic synthetic resin is plasticized or melts superficially, so that upon cooling the strips will adhere to each other and will be welded together.

The weld thus formed, however, is insufficient, because it is not firm enough and does not satisfy decorative requirements either. In addition a depression will form at the junction of the transverse and the continuous strips. In order to obviate these defects the junctions of the strip are covered with a layer of molten resin 8 and over said layer of resin the two strips are then secured to each other by means of a solder 9 melting at a low temperature, which solder will properly adhere to the plastic and to the intermediate layer of resin.

I have found that for the purposes according to the invention a solder composed of a predominant amount of sulphur having slighter amounts of other substances, such as aluminium powder, graphite, zinc oxide, and talcum powder admixed therewith, is particularly suited for achieving the objects of the invention. In addition to melting at a low temperature and being very light, said solder has the advantage that it properly adheres to plastic and can be applied in a manner which yields the decorative and artistic effect that is characteristic of leaded glass panes, so that the appearance of the real leaded glass panes is reproduced, while said solder is much cheaper than the conventional tin solder.

The imitiation leaded glass panes according to the invention offer the advantage that the plastic or synthetic resin is lighter and cheaper than lead. The lead is practically only obtainable in bars, which owing to their lack of rigidity are very vulnerable and which, therefore, must be very carefully packed and handled if they are not to be damaged and to become useless, and which at all events yield much waste. Seeing that the profiled plastic is flexible and all the same formstable, said plastic can be supplied in rolls, so that the cost of transport will be lower, while there will be no waste.

Furthermore the use of plastic or synthetic resin for the leaded glass panes opens up new possibilities for architecture, because the strips can be given any desired colour and can, therefore, at all events be matched to the colour scheme of the interior. The use of leaded glass panes has hitherto been limited by the gray colour of the lead which in many cases is not in harmony with the colour of the surroundings.

I claim:

1. A corner joint for two strips of thermoplastic supports for windowpanes and the like, said supports being H-shaped and supporting the edge of a pane between the legs of the H, comprising the end of one of said strips inserted between the legs of the H of the other of said strips to form a depression between the outside surface of said one strip and the ends of the legs of the other said strips, said one strip being heat bonded between the legs of the H of said other strip, a filler of molten resin in said depression, and a layer of low melting point plastic solder over said filler and the adjacent portions of said strips.

2. A corner joint as claimed in claim 1 in which said plastic solder is composed of a preponderant amount of sulphur with minor amounts of aluminum, graphite, zinc oxide and talcum powder.

3. A window comprising a plurality of panes of glass, thermoplastic supports for said panes having an H-shape, edges of said panes of glass supported between the legs of said H-shaped supports, joints between said supports at corners of the panes of glass comprising the end of one support split at the cross bar of the H-shape and heat bonded between the legs of the other H-shaped support to form depressions between outside surfaces of said support and the legs of the other support, said joints further comprising a filler of molten resin for said depressions and a layer of low melting point plastic solder covering said fillers and adjacent portions of said supports.

References Cited in the file of this patent

UNITED STATES PATENTS

| Number | Name | Date |
|---|---|---|
| 1,749,541 | Marr | Mar. 4, 1930 |
| 2,220,545 | Reinhardt | Nov. 5, 1940 |
| 2,342,237 | Barbieri | Feb. 22, 1944 |
| 2,343,106 | Carney | Feb. 29, 1944 |
| 2,388,297 | Slaughter | Nov. 6, 1945 |
| 2,394,870 | Orlin | Feb. 12, 1946 |
| 2,402,717 | Winer | June 25, 1946 |
| 2,408,317 | Jones | Sept. 24, 1946 |
| 2,550,520 | Bennett | Apr. 24, 1951 |
| 2,721,159 | Johnston | Oct. 18, 1955 |

FOREIGN PATENTS

| Number | Country | Date |
|---|---|---|
| 163,766 | Germany | Apr. 19, 1907 |
| 666,926 | Germany | Oct. 31, 1938 |